(12) United States Patent
Byltiauw et al.

(10) Patent No.: US 10,808,804 B2
(45) Date of Patent: Oct. 20, 2020

(54) TRANSMISSION FOR A VEHICLE AND DRIVELINE COMPRISING THE TRANSMISSION

(71) Applicant: DANA BELGIUM N.V., Bruges (BE)

(72) Inventors: Matthias Byltiauw, Roeselare (BE); Benoit Vandevoorde, Ghent (BE); Mark R. J. Versteyhe, Oostkamp (BE)

(73) Assignee: Dana Belgium N.V., Bruges (BE)

( * ) Notice: Subject to any disclaimer, the term of this patent is extended or adjusted under 35 U.S.C. 154(b) by 173 days.

(21) Appl. No.: 15/572,837

(22) PCT Filed: May 11, 2016

(86) PCT No.: PCT/EP2016/060591
§ 371 (c)(1),
(2) Date: Nov. 9, 2017

(87) PCT Pub. No.: WO2016/180898
PCT Pub. Date: Nov. 17, 2016

(65) Prior Publication Data
US 2018/0112746 A1    Apr. 26, 2018

Related U.S. Application Data

(60) Provisional application No. 62/159,554, filed on May 11, 2015.

(51) Int. Cl.
*F16H 3/093*  (2006.01)
*F16H 47/06*  (2006.01)

(52) U.S. Cl.
CPC ............. *F16H 3/093* (2013.01); *F16H 47/06* (2013.01); *F16H 2003/0936* (2013.01)

(58) Field of Classification Search
CPC .. F16H 3/093; F16H 47/06; F16H 2003/0936; F16H 2200/0043; F16H 59/08
(Continued)

(56) References Cited

U.S. PATENT DOCUMENTS 2,924,126 A * 2/1960 Isaacson ................. F16H 47/06
 74/733.1
3,064,488 A * 11/1962 Lee ......................... F16H 3/097
 74/360

(Continued)

FOREIGN PATENT DOCUMENTS

CN    103874612 A    6/2014
EP    0949106 A1    10/1999
(Continued)

OTHER PUBLICATIONS

European Patent Office, The International Search Report with Written Opinion issued in PCT/EP2016/060591, dated May 11, 2016; 14 pages, European Patent Office, Rijswijk, Netherlands.

*Primary Examiner* — Victor L MacArthur
*Assistant Examiner* — Gregory Robert Weber
(74) *Attorney, Agent, or Firm* — Marshall & Melhorn, LLC

(57) ABSTRACT

The invention relates to a transmission for a vehicle, in particular for a teleboom handler or for a backhoe loader, the transmission comprising: an input shaft; a first clutching assembly drivingly engaged with the input shaft; a second clutching assembly drivingly engaged with the first clutching assembly; a third clutching assembly drivingly engaged with the second clutching assembly; and an output clutching assembly drivingly engaged with the third clutching assembly.

18 Claims, 7 Drawing Sheets

(58) Field of Classification Search
USPC ..... 74/810.1, 730.1, 15.2, 15, 14, 13, 12, 11
See application file for complete search history.

(56) References Cited

U.S. PATENT DOCUMENTS

| | | | | |
|---|---|---|---|---|
| 3,599,511 | A * | 8/1971 | Storer, Jr. | F16H 47/06 74/718 |
| 3,893,345 | A * | 7/1975 | Sisson | F16H 3/085 74/331 |
| 4,392,391 | A * | 7/1983 | Jameson | F16H 3/093 74/331 |
| 5,249,475 | A * | 10/1993 | McAskill | F16H 3/093 74/331 |
| 6,105,710 | A | 8/2000 | Vandepitte | |
| 6,257,080 | B1 | 7/2001 | Shin | |
| 6,513,399 | B2 * | 2/2003 | Lamela | F16H 3/093 74/331 |
| 6,752,034 | B2 * | 6/2004 | Huber | F16H 3/093 74/331 |
| 6,988,426 | B2 | 1/2006 | Calvert | |
| 9,139,077 | B2 | 9/2015 | Yoshikawa et al. | |
| 2003/0136208 | A1 | 7/2003 | Calvert | |
| 2013/0298708 | A1 * | 11/2013 | Takeshita | F16H 3/093 74/331 |
| 2016/0084352 | A1 * | 3/2016 | Regenscheit | F16H 3/093 74/730.1 |

FOREIGN PATENT DOCUMENTS

| | | | |
|---|---|---|---|
| EP | 1275879 | A2 | 1/2003 |
| EP | 1987978 | A2 | 11/2008 |

\* cited by examiner

TRANSMISSION FOR A VEHICLE AND DRIVELINE COMPRISING THE TRANSMISSION

BACKGROUND OF THE INVENTION

The present invention relates to transmissions for vehicles and more specifically to transmission layouts for side and inline engine applications, such as for a teleboom handler.

Teleboom handler vehicles are vehicles of unique design. An operator of the teleboom handler sits in a cab located off-center and an engine is often also located off-center in order to accommodate a telescoping boom, which is typically located in the middle of the vehicle. As a result of this arrangement, a transmission joining the engine and the drive wheels can be unique. Such transmissions may inadequately or poorly address a location of an auxiliary pump, a location of the output of the transmission with respect to an axle input, and a desire to reduce a wheelbase of the vehicle.

Other vehicles, such as backhoe loaders, may also have unique transmission needs. Among these are the ability to engage both axles of the vehicle and to accommodate a vertical drop between an output of the engine and each of the inputs for the axles, which are typically at different heights.

It would be advantageous to develop a transmission layout for side and inline engine applications that is compact, reduces a cost of a transmission, and may be configured for a variety of applications.

This object is solved by a transmission according to claim 1. Further embodiments are described in the dependent claims.

The presently proposed transmission for a vehicle, in particular for a teleboom handler or for a backhoe loader, comprises:
- an input shaft;
- a first clutching assembly drivingly engaged with the input shaft;
- a second clutching assembly drivingly engaged with the first clutching assembly;
- a third clutching assembly drivingly engaged with the second clutching assembly; and
- an output clutching assembly drivingly engaged with the third clutching assembly.

The transmission may further include a torque converter assembly drivingly engaged with the input shaft and configured to be drivingly engaged with an engine output. The torque converter assembly may comprise a pump portion, a stator portion, and a turbine portion. The turbine portion may be drivingly engaged with the input shaft, and the pump portion may be drivingly engaged with an auxiliary output or power take-off, for example for a hydraulic pump. The input shaft may be hollow and the auxiliary output may extend through the input shaft and through a housing of the transmission. Also, the pump portion may be drivingly engaged with the auxiliary output through at least one geared portion.

The first clutching assembly may include at least one of:
- a main portion drivingly engaged with the input shaft,
- a drive output portion drivingly engaged with the second clutching assembly, and
- a clutching device configured to selectively drivingly engage the main portion of the first clutching assembly with the drive output portion of the first clutching assembly.

The main portion of the first clutching assembly may include a radially extending portion. The radially extending portion of the main portion of the first clutching assembly may be in driving engagement with a geared portion of the input shaft and/or with the second clutching assembly.

The drive output portion of the first clutching assembly and the radially extending portion of the main portion of the first clutching assembly may have different drive ratios. In particular, the drive output portion of the first clutching assembly and the radially extending portion of the main portion of the first clutching assembly may be configured to selectively adjust a drive ratio between the input shaft and the second clutching assembly.

The second clutching assembly may include at least one of:
- a main portion drivingly engaged with the first clutching assembly and with the third clutching assembly,
- a first drive portion drivingly engaged with the third clutching assembly,
- a first clutching device configured to selectively drivingly engage the main portion of the second clutching assembly with the first drive portion of the second clutching assembly,
- a second drive portion drivingly engaged with the third clutching assembly, and
- a second clutching device configured to selectively drivingly engage the main portion of the second clutching assembly with the second drive portion of the second clutching assembly.

The main portion of the second clutching assembly may include a radially extending portion in driving engagement with the drive output portion of the first clutching assembly and/or with the third clutching assembly. The first drive portion of the second clutching assembly may be in driving engagement with the radially extending portion of the main portion of the first clutching assembly.

The transmission may further include an idler gear assembly, wherein the idler gear assembly may include a first geared portion in driving engagement with the first drive portion of the second clutching assembly. The idler gear assembly may further include a second geared portion in driving engagement with the third clutching assembly.

The third clutching assembly may include at least one of:
- a main portion drivingly engaged with the second clutching assembly and with the output clutching assembly,
- a first drive portion drivingly engaged with the second clutching assembly,
- a first clutching device configured to selectively drivingly engage the main portion of the third clutching assembly with the first drive portion of the third clutching assembly,
- a second drive portion drivingly engaged with the second clutching assembly and with the output clutching assembly, and
- a second clutching device configured to selectively drivingly engage the main portion of the third clutching assembly with the second drive portion of the third clutching assembly.

The first drive portion of the third clutching assembly may be in driving engagement with the second geared portion of the idler gear assembly.

The main portion of the third clutching assembly may include a radially extending portion in driving engagement with the radially extending portion of the main portion of the second clutching assembly and/or with the output clutching assembly.

The second drive portion of the third clutching assembly may include a first radially extending portion in driving engagement with the second drive portion of the second clutching assembly. The second drive portion of the third clutching assembly may include a second radially extending portion in driving engagement with the output clutching assembly.

The output clutching assembly may include at least one of:
- a main portion drivingly engaged with the third clutching assembly,
- a drive portion drivingly engaged with the third clutching assembly, and
- a clutching device configured to selectively drivingly engage the main portion of the output clutching assembly with the drive portion of the output clutching assembly.

The main portion of the output clutching assembly may include a radially extending portion in driving engagement with the second radially extending portion of the second drive portion of the third clutching assembly. The drive portion of the output clutching assembly may be in driving engagement with a radially extending portion of the main portion of the third clutching assembly.

Furthermore, a driveline for a vehicle is presently proposed. The driveline may comprise:
- the previously described transmission;
- a front axle;
- a rear axle;
- a front shaft assembly drivingly engaged with the front axle; and
- a rear shaft assembly drivingly engaged with the rear axle.

The output clutching assembly of the transmission may be drivingly engaged with at least one of or both the front shaft assembly and the rear shaft assembly.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1A:
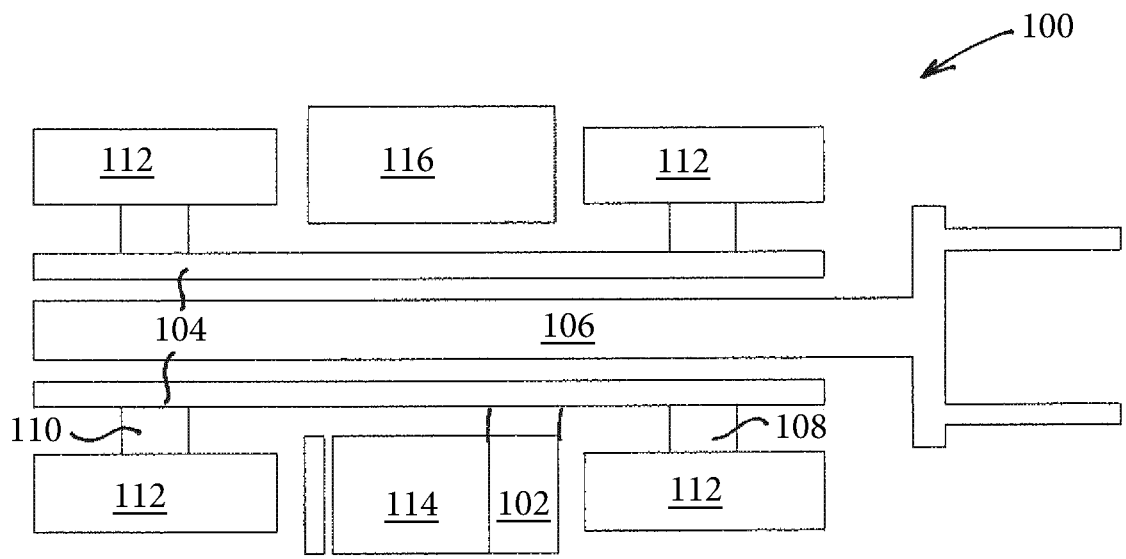
FIG. 1A shows a top view of a general layout of a vehicle including a transmission according to an embodiment of the invention.
Figure 1B:
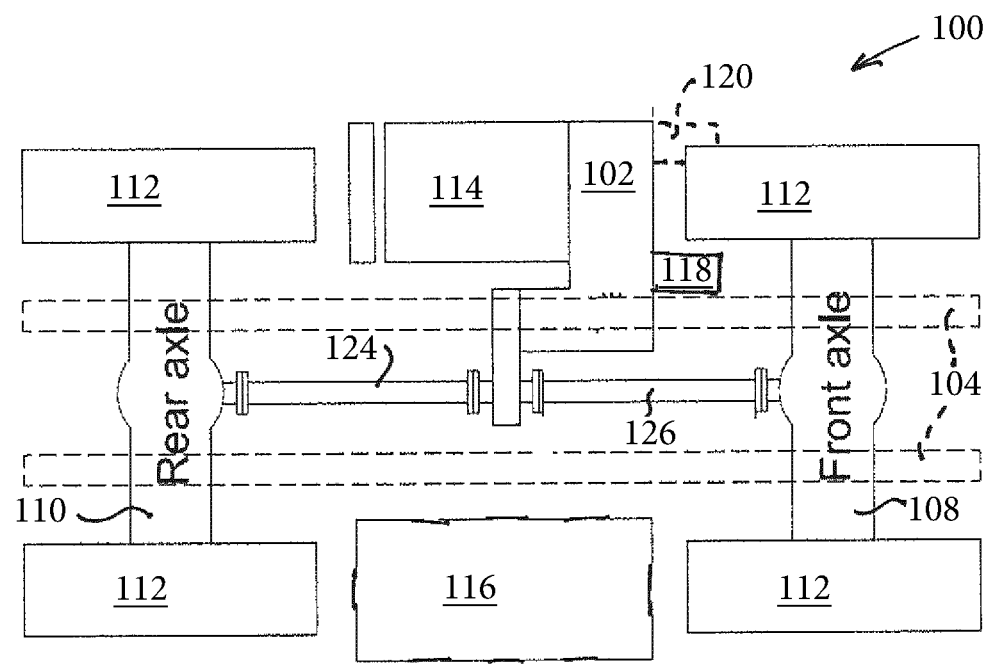
FIG. 1B shows a bottom view of the vehicle layout shown in FIG. 1A.

FIGS. 1A and 1B show a general layout of a vehicle 100 incorporating a transmission 102 according to an embodiment of the invention. The vehicle 100 is a teleboom handler; however, it is understood that the transmission 102 may be configured for use with other vehicles such as a backhoe loader. The vehicle 100 includes a chassis 104, a boom 106, the front axle 108, a rear axle 110, wheels, 112 an engine 114, the transmission 102, and an operator cabin 116. FIG. 1B illustrates the vehicle 100 from a bottom plan view, the vehicle 100 further including an auxiliary pump 118, an alternate location 120 for the auxiliary pump 118, a rear shaft assembly 124, and a front shaft assembly 126.

Figure 2:
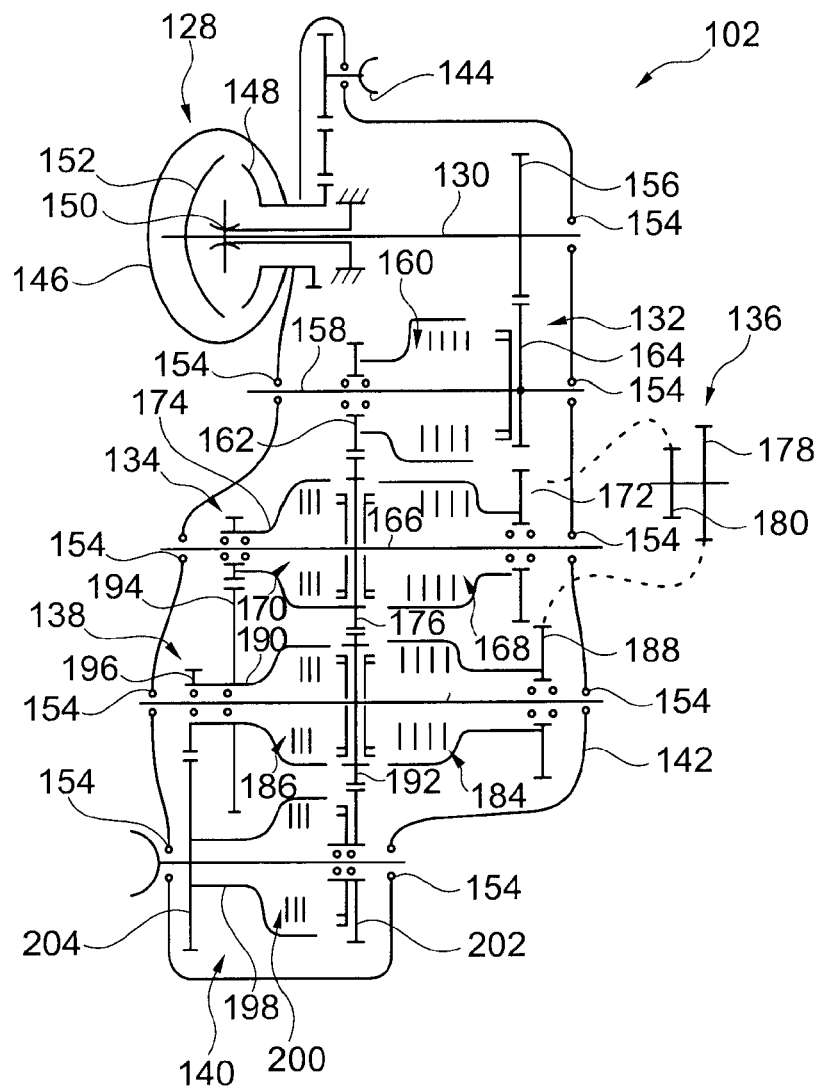
FIG. 2 shows an illustration of a transmission according to a first embodiment of the invention.
Figure 3:
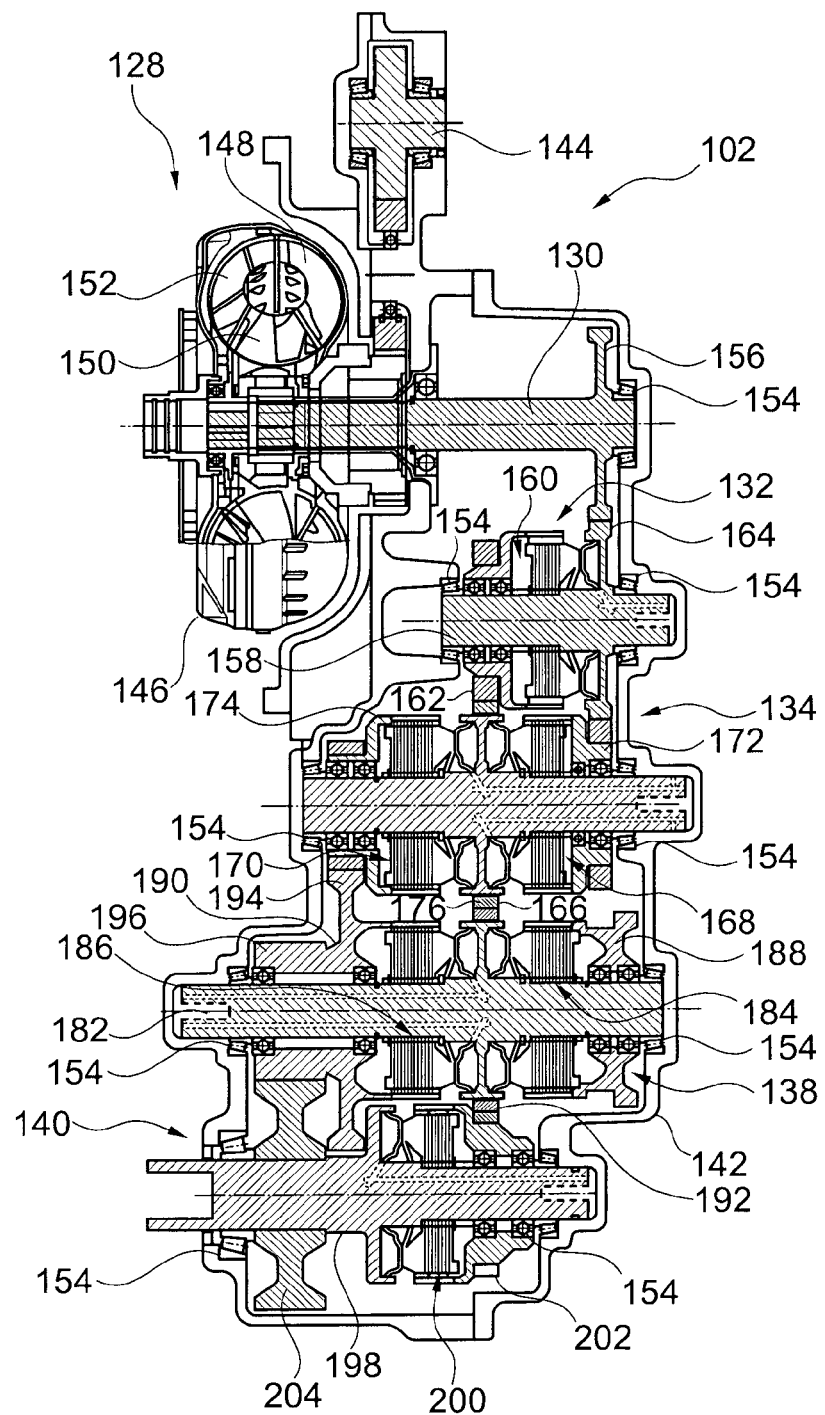
FIG. 3 shows another illustration of the transmission according to the first embodiment.
Figure 4:
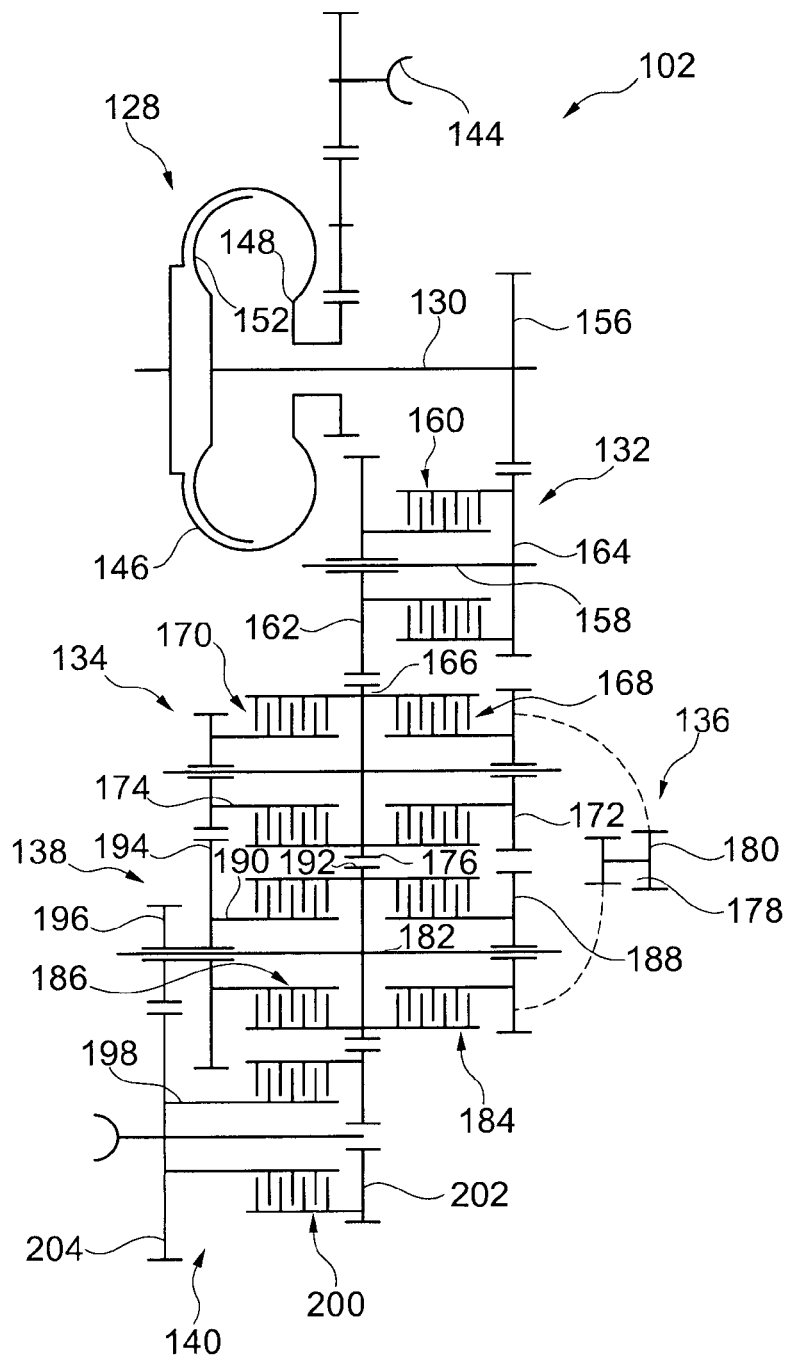
FIG. 4 shows another illustration of the transmission according to the first embodiment.

FIGS. 2, 3 and 4 illustrate the transmission 102 according to a first embodiment of the invention. Here and in the following, recurring features are designated with the same reference signs. The transmission 102 shown in FIGS. 2, 3 and 4 may be used with a vehicle having an engine positioned along a side of the vehicle, such as the vehicle 100 shown in FIG. 1. The transmission 102 includes a torque converter assembly 128, an input shaft 130, a first clutching assembly 132, a second clutching assembly 134, an idler gear assembly 136, a third clutching assembly 138 and an output clutching assembly 140. The input shaft 130, the idler gear assembly 136, and the clutching assemblies 132, 134, 138, 140 are rotatably disposed within a transmission housing 142. The torque converter assembly 128 is coupled to the transmission housing 142 and is in driving engagement with the input shaft 130 and an auxiliary output 144.

Figure 5:
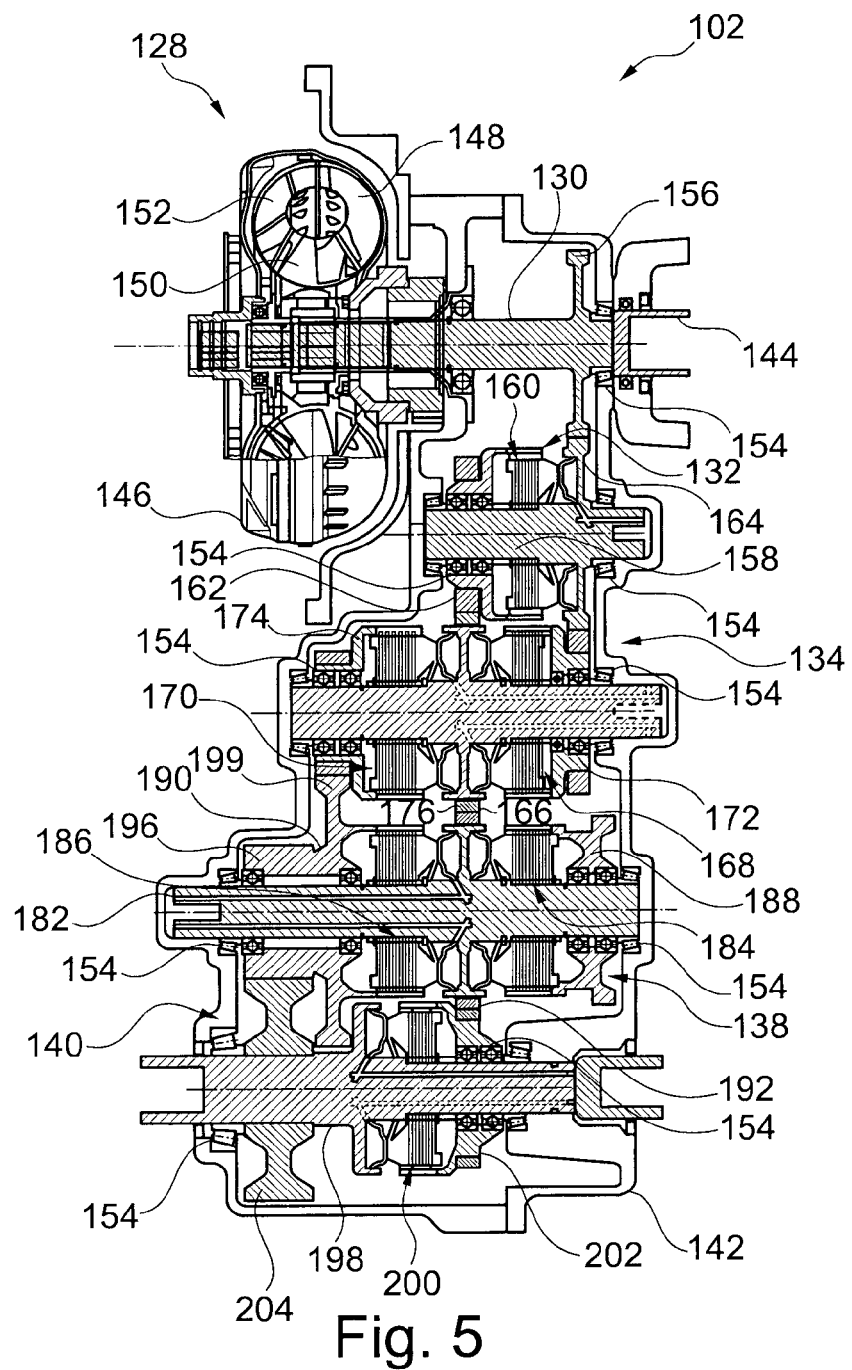
FIG. 5 shows an illustration of a transmission according to a second embodiment of the invention.
Figure 6:
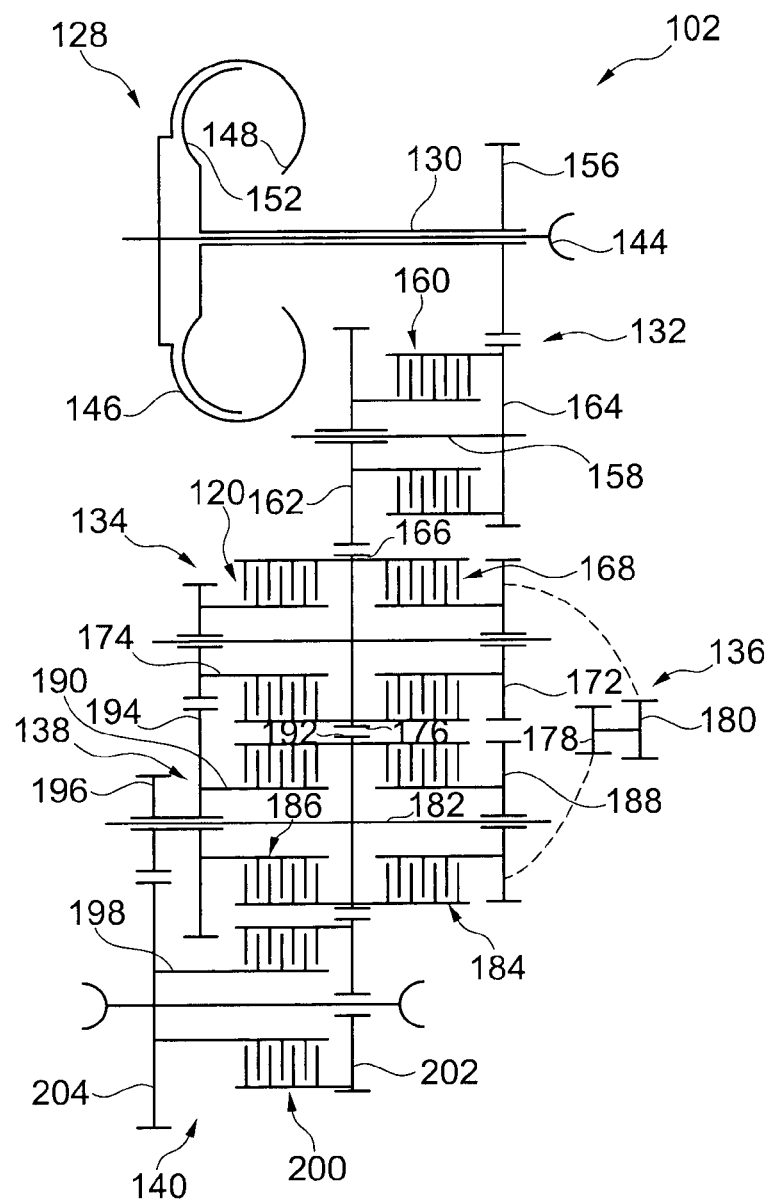
FIG. 6 shows another illustration of the transmission according to the second embodiment.

The torque converter assembly 128 comprises a housing 146, a pump portion 148, a stator portion 150, and a turbine portion 152. The torque converter assembly 128 functions as a torque converter, which is well known in the art. As shown in FIGS. 2-4, the pump portion 148 is in driving engagement with the auxiliary output 144 and an engine output (not shown), such as a crankshaft of an internal combustion engine (not shown). As shown in FIGS. 5 and 6, which is a variation of the invention shown in FIGS. 2-4, an auxiliary output 144 extends through the input shaft 130 (which is hollow) and the transmission housing 142. The stator portion 150 is coupled to the transmission housing 142 and is non-rotatable with respect thereto; however, it is understood that the stator portion 150 may be coupled to another portion of the vehicle 100. The turbine portion 152 is in driving engagement with the input shaft 130. In response to torque being applied to the pump portion 148 from the internal combustion engine, power is transferred to the input shaft 130 through the turbine portion 152.

FIGS. 2-4 illustrate the input shaft 130 in driving engagement with the turbine portion 152 and the first clutching assembly 132. The input shaft 130 is a shaft rotatably mounted in the transmission housing 142 through the use of at least one bearing 154 disposed in the transmission housing 142, however, the input shaft 130 may also comprise a plurality of gears or another type of mechanical connection. The input shaft 130 includes a geared portion 156. The geared portion 156 is a toothed, radially extending portion of the input shaft 130 in driving engagement with a portion of the first clutching assembly 132. The geared portion 156 is formed separate from and coupled to a remaining portion of the input shaft 130 in any conventional manner, but it is understood that the geared portion 156 may be unitarily formed.

The first clutching assembly 132 is a clutch and gear assembly drivingly engaged with the input shaft 130 and the second clutching assembly 134. The first clutching assembly 132 includes a main portion 158, a clutching device 160, and a drive output portion 162. The main portion 158 and the drive output portion 162 define two power-paths between the input shaft 130 and the second clutching assembly 134. The clutching device 160 facilitates at least variable driving engagement between the main portion 158 and the drive output portion 162. The main portion 158 is a shaft rotatably mounted in the transmission housing 142 through the use of at least a pair of bearings 154 disposed in the transmission housing 142.

The main portion 158 includes a radially extending portion 164 which is in driving engagement with the geared portion 156 and a portion of the second clutching assembly 134. The radially extending portion 164 is formed separate from and coupled to a remaining portion of the main portion 158 in any conventional manner, but it is understood that the main portion 158 may be unitarily formed. The drive output portion 162 is in driving engagement with a portion of the second clutching assembly 134. The drive output portion 162 and the clutching device 160 are disposed about an axially extending portion of the main portion 158. It is understood that the components 162, 164 of the first clutching assembly 132 may be selected to adjust a drive ratio between the input shaft 130 and the second clutching assembly 134.

The clutching device 160 is a plate style clutch, however, it is understood that the clutching device 160 may be any type of clutch that may be variably engaged. By engaging the clutching device 160, the main portion 158 becomes drivingly engaged with the drive output portion 162. It is understood that the power-paths associated with the drive output portion 162 and the radially extending portion 164 may each have a different drive ratio.

The second clutching assembly 134 is a clutch and gear assembly drivingly engaged with the first clutching assembly 132, the third clutching assembly 138, and the idler gear assembly 136. The second clutching assembly 134 includes a main portion 166, a first clutching device 168, a second clutching device 170, a first drive portion 172, and a second drive portion 174. The main portion 166, the first drive portion 172, and the second drive portion 174 form four power-paths between the radially extending portion 164, the drive output portion 162, two portions of the third clutching assembly 138, and the idler gear assembly 136. It is understood that the components 166, 172, 174 of the second clutching assembly 134 may be selected to adjust a drive ratio between one of the radially extending portion 164 and the drive output portion 162 and the two portions of the third clutching assembly 138 the second clutching assembly 134 is drivingly engaged with. The first clutching device 168 facilitates at least variable driving engagement between the main portion 166 and the first drive portion 172. The second clutching device 170 facilitates at least variable driving engagement between the main portion 166 and the second drive portion 174.

The main portion 166 is a shaft rotatably mounted in the transmission housing 142 through the use of at least a pair of bearings 154 disposed in the transmission housing 142. The main portion 166 includes a radially extending portion 176 which is in driving engagement with the drive output portion 162 and a portion of the third clutching assembly 138. The radially extending portion 176 is formed separate from and coupled to a remaining portion of the main portion 166 in any conventional manner, but it is understood that the main portion 166 may be unitarily formed. The first drive portion 172 is in driving engagement with the radially extending portion 164. The second drive portion 174 is in driving engagement with a portion of the third clutching assembly 138. The first drive portion 172 and the first clutching device 168 are disposed about an axially extending portion of the main portion 166. The second drive portion 174 and the second clutching device 170 are disposed about an axially extending portion of the main portion 166, opposite the radially extending portion 176 from the first drive portion 172 and the first clutching device 168.

The idler gear assembly 136 is a shaft and gear assembly rotatably mounted in the transmission housing 142 through the use of at least a pair of bearings (not shown) disposed in the transmission housing 142. The idler gear assembly 136 is drivingly engaged with the second clutching assembly 134 and the third clutching assembly 138. The idler gear assembly 136 includes a first geared portion 178 and a second geared portion 180. It is understood that the components 178, 180 of the idler gear assembly 136 may be selected to adjust a drive ratio between one of the radially extending portion 172 and a portion of the third clutching assembly 138 the idler gear assembly 136 is drivingly engaged with. The first geared portion 178 is in driving engagement with the radially extending portion 172. The second geared portion 180 is in driving engagement with a portion of the third clutching assembly 138. The first geared portion 178 and the second geared portion 180 are formed separate from and coupled to a remaining portion of the idler gear assembly 136 in any conventional manner, but it is understood that the idler gear assembly 136 may be unitarily formed.

The third clutching assembly 138 is a clutch and gear assembly drivingly engaged with the second clutching assembly 134 and the idler gear assembly 136. The third clutching assembly 138 includes a main portion 182, a first clutching device 184, a second clutching device 186, a first drive portion 188, and a second drive portion 190. The main portion 182, the first drive portion 188, and the second drive portion 190 form five power-paths between the radially extending portion 176, the second drive portion 174, the second geared portion 180, and two portions of the output clutching assembly 140. It is understood that the components 182, 188, 190 of the third clutching assembly 138 may be selected to adjust a drive ratio between one of the radially extending portion 176, the second geared portion 180, and the second drive portion 174 and the two portions of the output clutching assembly 140 the third clutching assembly 138 is drivingly engaged with. The first clutching device 184 facilitates at least variable driving engagement between the main portion 182 and the first drive portion 188. The second clutching device 186 facilitates at least variable driving engagement between the main portion 182 and the second drive portion 190.

The main portion 182 is a shaft rotatably mounted in the transmission housing 142 through the use of at least a pair of bearings 154 disposed in the transmission housing 142. The main portion 182 includes a radially extending portion 192 which is in driving engagement with the radially extending portion 176 and a portion of the output clutching assembly 140. The radially extending portion 192 is formed separate from and coupled to a remaining portion of the main portion 182 in any conventional manner, but it is understood that the main portion 182 may be unitarily formed. The first drive portion 188 is in driving engagement with the second geared portion 180. The second drive portion 190 includes two geared radially extending portions 194, 196 which are respectively in driving engagement with the second drive portion 174 and a portion of the output clutching assembly 140. The first drive portion 188 and the first clutching device 184 are disposed about an axially extending portion of the main portion 182. The second drive portion 190 and the second clutching device 186 are disposed about an axially extending portion of the main portion 182, opposite the radially extending portion 192 from the first drive portion 188 and the first clutching device 184.

As shown in FIG. 2, the output clutching assembly 140 is a clutch and gear assembly drivingly engaged with the radially extending portions 192, 196, the rear shaft assembly 124 (shown in FIG. 1B), and the front shaft assembly 126 (shown in FIG. 1B). As shown in FIGS. 3 and 4, the output clutching assembly 140 is a clutch and gear assembly drivingly engaged with the radially extending portions 192, 196 and the rear shaft assembly 124 (shown in FIG. 1B). It is understood that the transmission 102 may be configured to be drivingly engaged with both the rear shaft assembly 124 and the front shaft assembly 126 or solely with one of the rear shaft assembly 124 and the front shaft assembly 126. The output clutching assembly 140 includes a main portion 198, a clutching device 200, and a drive portion 202. The main portion 198 and the drive portion 202 define two power-paths between the radially extending portions 192, 196 and the rear shaft assembly 124 and the front shaft assembly 126, where applicable. It is understood that the components 198, 202 of the output clutching assembly 140 may be selected to adjust a drive ratio between the main portion 198 and the radially extending portions 192, 196. The clutching device 200 facilitates at least variable driving engagement between the main portion 198 and the drive portion 202.

The main portion 198 is a shaft rotatably mounted in the transmission housing 142 through the use of at least a pair of bearings 154 disposed in the transmission housing 142. The main portion 198 includes a radially extending portion 204 which is in driving engagement with the radially extending portion 196. The radially extending portion 204 is formed separate from and coupled to a remaining portion of the main portion 198 in any conventional manner, but it is understood that the main portion 198 may be unitarily formed. The drive portion 202 is in driving engagement with the radially extending portion 192. The drive portion 202 and the clutching device 200 are disposed about an axially extending portion of the main portion 198. The main portion 198 is also drivingly engaged at ends thereof, which extend through the transmission housing 142, with the rear shaft assembly 124 and the front shaft assembly 126 in any conventional manner, such as, but not limited to, a universal joint.

The clutching device 200 is a plate style clutch, however, it is understood that the clutching device 200 may be any type of clutch that may be variably engaged. By engaging the clutching device 200, the main portion 198 becomes drivingly engaged with the drive portion 202. It is understood that the powerpaths associated with the main portion 198 and the drive portion 202 may each have a different drive ratio.

In use, the transmission 102 may be placed in a plurality of drive ratios by simultaneously engaging one of the clutching devices 160, 168, 184 and one of the remaining clutching devices 170, 186, 200. As non-limiting example, the clutching device 160 may be configured to implement a forward low gear drive ratio, the clutching device 168 may be configured to implement a forward high gear drive ratio, and the clutching device 184 may be configured to implement a reverse drive ratio. As further non-limiting examples, the clutching device 170 may be configured to implement a first drive ratio, the clutching device 186 may be configured to implement a second drive ratio, and the clutching device 200 may be configured to implement a third drive ratio.

As shown in FIGS. 2-4 and in FIGS. 5 and 6 two variants of a layout for the transmission 102 are illustrated. The variant of the transmission 102 shown in FIGS. 2-4 may be preferable for use with the vehicle 100 having the engine 114 set-up along a side of the vehicle 100. The variant of the transmission 102 shown in FIGS. 5 and 6 may be preferable for use with the vehicle having an engine arranged in-line with the vehicle. The main difference between the variants of the layout for the transmission 102 is a position of the auxiliary output 144 (power take-off) for a pump and the incorporation of an additional output flange (See FIGS. 4 and 6). Beside the differences described hereinabove, the layout of the transmissions shown in FIGS. 2-4 and in FIGS. 5 and 6 is the same.

Consequently, the same platform of the transmission 102 can be used for a backhoe loader transmission by adding an additional output shaft below the output clutching assembly 140, for example. The additional output shaft would be drivingly engaged with a front axle of the vehicle.

The benefits of the layout for the transmission 102 as described herein above are numerous. The transmission 102 has a reduced length, which allows a wheelbase of the vehicle the transmission 102 is incorporated in to remain short. The wheelbase is determined by the diameter of the wheel, the length of the engine and the length of the transmission. Further, the transmission 102 provides for increased versatility in locating a pump used with the vehicle 100. A location of the pump may be crucial because when done in a proper way, a location of the pump may allow for the wheelbase to be reduced. Since the transmission 102 is located near a front of the vehicle 100, the front shaft assembly 126 is reduced in length.

Locating the output of the transmission 102 closer to a back of the vehicle 100 provides for the front shaft assembly 126 having an increased length. The front shaft assembly 126 having an increased length is beneficial to reduce misalignment between the output of the transmission 102 and an input of the front axle 108 by reducing a misalignment angle. Consequently, an input of the transmission 102 is substantially aligned with an output of the engine 114 and the output of the transmission 102 is substantially aligned with the input to the axle. Such positioning provides a drop in a vertical direction and an adjustment in the horizontal direction.

Figure 7:
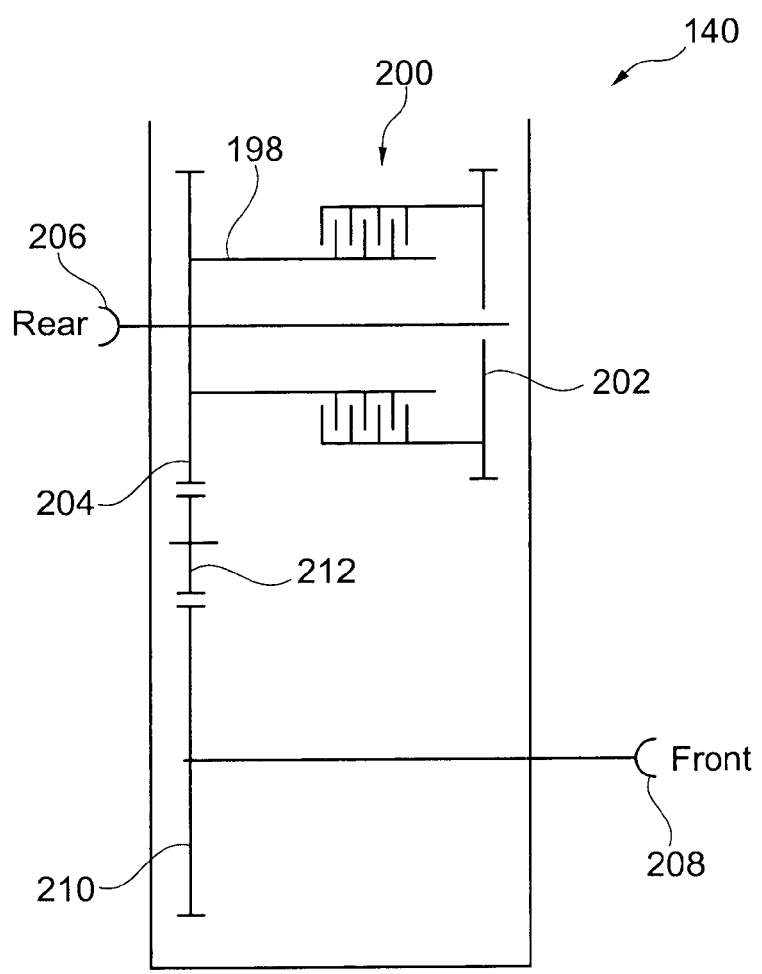
FIG. 7 shows an alternative arrangement of an output clutching assembly of the transmission according to the first or the second embodiment.

FIG. 7 shows an alternative arrangement of the output clutching assembly 140 of the transmission 102. The alternative arrangement of the output clutching assembly 140 shown in FIG. 7 may be combined with the transmissions 102 according to FIGS. 2-4 or with the transmission 102 according to FIGS. 5-6. The output clutching assembly 140 shown in FIG. 7 may be particularly suited for use in backhoe loaders. Usually, a radius of the front wheels of a backhoe loader is smaller than a radius of the rear wheels. In other words, the front axle and the rear axle of a backhoe loader are usually disposed at different heights relative to the ground and/or relative to the transmission 102. Thus, for use of the transmission 102 in a backhoe loader it may be advantageous to provide an additional gear stage between the main portion 198 of the output clutching assembly 140 and a front output 208 of the output clutching assembly 140. For example, such an arrangement may facilitate bridging the distance between the transmission 102 and the front axle 108.

FIG. 7 illustrates that the main portion 198 of the output clutching assembly 140 is drivingly engaged with a rear output 206. For example, the main portion 198 and the rear output 206 may be integrally formed. However, it is also conceivable that the main portion 198 and the rear output 206 are configured as separate parts. The rear output 206 may be connected to the rear shaft assembly 124. FIG. 7 further illustrates that a front output 208 of the output clutching assembly 140 is drivingly engaged with the main portion 198 via an additional gear stage including an idler gear 212 and a geared portion 210. The front output 208 may be connected to the front shaft assembly 126. Due to the additional gear stage provided between the front output 208 and the main portion 198, an axis of rotation of the front output 208 is arranged in parallel with and at a distance from an axis of rotation of the rear output 206. For example, the front output 208 may be disposed closer to the ground than the rear output 206.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A transmission for a vehicle, the transmission comprising:
    an input shaft;
    a first clutching assembly drivingly engaged with the input shaft;
    a second clutching assembly drivingly engaged with the first clutching assembly;
    a third clutching assembly drivingly engaged with the second clutching assembly;
    an output clutching assembly drivingly engaged with the third clutching assembly;
    an idler gear assembly having a shaft portion having a first geared portion and a second geared portion thereon;
        wherein the shaft portion of the idler gear assembly is parallel to and interposed between the main portion of the first clutching device and the main portion of the second clutching device;
        wherein the first geared portion of the idler gear assembly is in driving engagement with a first drive portion of the second clutching assembly;
        wherein the second geared portion of the idler gear assembly is in driving engagement with the third clutching assembly;
    a torque converter assembly comprising a pump portion, a stator portion and a turbine portion; and
        wherein the turbine portion is drivingly engaged with the input shaft.

2. The transmission according to claim 1, wherein the first clutching assembly comprises:
    a main portion drivingly engaged with the input shaft;
    a drive output portion drivingly engaged with the second clutching assembly; and
    a clutching device facilitating at least variable driving engagement between the main portion of the first clutching assembly and the drive output portion of the first clutching assembly.

3. The transmission according to claim 2, wherein the main portion of the first clutching assembly comprises a radially extending portion;
    wherein the radially extending portion of the main portion of the first clutching assembly is in driving engagement with a geared portion of the input shaft and with the second clutching assembly.

4. The transmission according to claim 2, wherein the drive output portion of the first clutching assembly and the radially extending portion of the main portion of the first clutching assembly have different drive ratios and are configured to selectively adjust a drive ratio between the input shaft and the second clutching assembly.

5. The transmission according to claim 1, wherein the second clutching assembly comprises:
    a main portion drivingly engaged with the first clutching assembly and with the third clutching assembly;
    a first drive portion drivingly engaged with the third clutching assembly;
    a first clutching device facilitating at least variable driving engagement between the main portion of the second clutching assembly and the first drive portion of the second clutching assembly;
    a second drive portion drivingly engaged with the third clutching assembly; and
    a second clutching device facilitating at least variable driving engagement between the main portion of the second clutching assembly and the second drive portion of the second clutching assembly.

6. The transmission according to claim 5, wherein the main portion of the second clutching assembly further comprises a radially extending portion;
    wherein the radially extending potion is in driving engagement with a drive output portion of the first clutching assembly and with the third clutching assembly; and
    wherein the first drive portion of the second clutching assembly is in driving engagement with a radially extending portion of the main portion of the first clutching assembly.

7. The transmission according to claim 1, wherein the third clutching assembly comprises:
    a main portion drivingly engaged with the second clutching assembly and with the output clutching assembly;
    a first drive portion drivingly engaged with the second clutching assembly;
    a first clutching device facilitating at least variable driving engagement between the main portion of the third clutching assembly and the first drive portion of the third clutching assembly;
    a second drive portion drivingly engaged with the second clutching assembly and with the output clutching assembly; and
    a second clutching device facilitating at least variable driving engagement between the main portion of the third clutching assembly and the second drive portion of the third clutching assembly.

8. The transmission according to claim 7, wherein the first drive portion of the third clutching assembly is in driving engagement with the second geared portion of the idler gear assembly.

9. The transmission according to claim 7, wherein a main portion of the second clutching assembly comprises a radially extending portion; and
    wherein the main portion of the third clutching assembly further comprises a radially extending portion which is in driving engagement with the radially extending portion of the main portion of the second clutching assembly and with the output clutching assembly.

10. The transmission according to claim 7, wherein the second drive portion of the third clutching assembly further comprises a first radially extending portion in driving engagement with the second drive portion of the second clutching assembly; and wherein the second drive portion of the third clutching assembly further comprises a second radially extending portion in driving engagement with the output clutching assembly.

11. The transmission according to claim 1, wherein the output clutching assembly further comprises:
a main portion drivingly engaged with the third clutching assembly;
a drive portion drivingly engaged with the third clutching assembly; and
a clutching device facilitating at least variable driving engagement between the main portion of the output clutching assembly and the drive portion of the output clutching assembly.

12. The transmission according to claim 11, wherein the main portion of the output clutching assembly further comprises a radially extending portion which is in driving engagement with a second radially extending portion of a second drive portion of the third clutching assembly; and wherein the drive portion of the output clutching assembly is in driving engagement with a radially extending portion of a main portion of the third clutching assembly.

13. The transmission of claim 1, wherein at least a portion of the input shaft extends through a hollow interior portion of the stator portion of the torque converter assembly.

14. The transmission of claim 1, wherein the transmission is used in a teleboom handler or a backhoe loader.

15. The transmission of claim 1, wherein the pump portion is drivingly engaged with an auxiliary output that extends through the housing of the transmission.

16. The transmission of claim 15, wherein the portion of the auxiliary output extending outside the housing of the transmission is drivingly engaged with an engine output.

17. The transmission of claim 16, wherein the engine output is a crankshaft.

18. The transmission of claim 16, wherein the engine output is a crankshaft of an internal combustion engine.

* * * * *